United States Patent [19]

Ebbing

[11] 3,969,768
[45] July 13, 1976

[54] MAGNETIC DISK HEAD CARRIAGE
[75] Inventor: Peter F. M. Ebbing, Sunnyvale, Calif.
[73] Assignee: Tri-Data, Mountain View, Calif.
[22] Filed: July 5, 1974
[21] Appl. No.: 486,193

[52] U.S. Cl. ............................... 360/107; 360/86; 360/103; 360/106
[51] Int. Cl.² ................... G11B 5/55; G11B 21/20; G11B 25/04
[58] Field of Search ............ 360/107, 106, 102–104, 360/109, 97–99, 86; 179/100.1 PS, 100.1 DR, 100.4 R; 74/25–28, 89.14, 89.15, 440–441

[56] References Cited
UNITED STATES PATENTS

| | | | |
|---|---|---|---|
| 3,177,495 | 4/1965 | Felts | 360/103 |
| 3,682,481 | 8/1972 | Whitlock | 360/105 |
| 3,770,905 | 11/1973 | Sperry | 360/109 |
| 3,814,441 | 6/1974 | Craggs | 360/105 |
| 3,852,816 | 12/1974 | Stewart | 360/86 |
| 3,855,622 | 12/1974 | Truscelli | 360/103 |

*Primary Examiner*—Alfred H. Eddleman

[57] ABSTRACT

A magnetic disk head carriage is described comprising a one-piece injection molded-head receiving platform having a pair of spaced symetrically-positioned beam-shaped legs. The legs of the platform are each terminated by a threaded bore for threadably receiving a lead screw. A spring is provided between the legs for spreading the legs against opposing threads of the lead screw. A magnetic head assembly is mounted on the platform and extends between the legs to a position over the center line of the lead screw. The carriage assembly, thus arranged, provides for cancelling the effects of compliance and provides flexibility in the directions required for wear, damping, thermal expansion and backlash compensation while retaining sufficient rigidity for controlling head-to-disk interface dimensional stability and the dissipation of stepper motor torque forces.

18 Claims, 8 Drawing Figures

MAGNETIC DISK HEAD CARRIAGE

BACKGROUND OF THE INVENTION

The present invention relates to magnetic disk recording apparatus in general and in particular to an improved magnetic head carriage for use in such equipment.

All magnetic disk recording apparatus to which the present invention is related comprise a circular rotatable disk which is provided with one or more recording surfaces. The disk may be relatively rigid, in which event, the machine in which it is used is called a rigid disk machine, or it may be thin and relatively flexible, in which event, the machine in which it is used is called a flexible disk machine. Due to the flexibility of the latter type of disk, the flexible disks are also known as "floppy" disks because, when stationary, the flexible disk assumes a floppy geometry about its supporting spindle and, when in use, is caused to conform somewhat to the contour of a recording head.

All disk machines use some type of recording head. In rigid disk machines, the head is typically spring-loaded and positioned to "fly" on a film of air created by the rotation of the disk. That is, the head is not in direct contact with the disk surface. By maintaining the head spaced from the rotating disk, the head remains free from damage due to abrasion and like effects which would be likely to occur if the head were held in contact with the disk surface. In contrast, the head in a flexible disk machine is typically held in contact with the disk surface by means of a pressure pad located opposite the head on the opposite surface of the disk.

The recordings on both rigid and flexible disks are made in annular concentric rings or tracks about the axis of rotation of the disk. Moving a recording head from one track to another is called indexing. For indexing a head radially over the surface of a disk there is provided in both flexible as well as rigid disk machines, an assembly called a head carriage. In a rigid disk machine, the head carriage typically comprises a head assembly receiving platform on which a magnetic head assembly is mounted. The platform is provided with rollers or sliders and moved along fixed tracks for moving the head assembly back and forth radially over the surface of the disk by means of an assembly of wires or chains or a combination of these. While capable of precise head-to-track registration, the platform and head assemblies of the rigid disk machines are typically quite massive and expensive.

In flexible disk machines, the head carriage on which a magnetic head assembly is mounted is generally driven by a lead screw. The lead screw is powered by a stepper motor and threadably coupled to the platform for moving the platform and the head assembly mounted thereon radially over the surface of the disk. To compensate for backlash between the lead screw and the platform, it has been the practice to bias the carriage in the flexible disk machines against the threads of the lead screw by means of a spring and a spring-retaining nut threaded on the lead screw. This arrangement, however, has several disadvantages, one of which is due to the effects of cumulative wear which occurs in time between the lead screw threads and the platform. One serious effect of this wear is an ever increasing shift of the platform and head from an initial predetermined position on the disk to a new position in the direction of the spring force against the platform. It can be appreciated that such shifting of the platform and head will in time, unless in some way compensated for, result in interference between the recording and reproduction of recorded signals on adjacent tracks.

In addition to the problem of lead screw thread wear, prior known flexible disk machines using lead screw driven head carriages have also exhibited head skewing caused by erratic movement of the carriage in a direction transverse to the longitudinal axis of the lead screw. This movement is generally attributed to clearances provided between various carriage guiding members on the platform and the lead screw, which are provided of necessity to prevent binding between the lead screw and the platform. In known flexible disk machines, such guiding members may, for example, take the form of a smooth bore in one leg of the platform through which the lead screw is passed for threadable engagement with a second leg.

Heretofore, the effect of thread wear between the lead screw and the platform and the effect of traverse movement of the carriage relative to the longitudinal axis of the lead screw has been compensated for, at least in part, by the employment of a straddle erase head, also known as a tunnel erase head. The straddle erase head comprises a plurality of pole pieces which are arranged in a single head structure for forming a read/write head and a pair of spaced apart erase heads. The erase heads are positioned to overlap the track of the read/write head. Being so positioned, the outer boundaries or peripheral edges of the track of recorded signals made by the read/write head are erased by the spaced erase heads. In this fashion, there is provided, in addition to a narrow zone of unrecorded space between adjacent tracks due to normal indexing of the head carriage, a zone of unrecorded space adjacent both edges of the recorded space in each track. By means of this additional unrecorded zone, destructive interference between recorded signals on adjacent tracks is greatly reduced. As a consequence, the employment of straddle erase heads to compensate for thread wear and unpredictable carriage movement results in an undesirable reduction of valuable recording space and increases the costs of manufacturing. On the other hand, lead screw driven head carriages are otherwise typically simpler, lighter, and less expensive to manufacture and maintain and are, therefore, more desirable than the prior known head carriages used in known rigid disk machines.

SUMMARY OF THE INVENTION

In view of the foregoing, a principal object of the present invention is an improved magnetic disk head carriage assembly which retains the advantages, while avoiding the disadvantages, of prior known lead screw driven head carriage assemblies.

A further object of the present invention in keeping with the aforementioned object is an improved head carriage assembly with means for ensuring that the lead screw to head mounting platform relationship remains permanently fixed by providing for automatic frictional wear, thermal expansion and backlash compensation.

A still further object of the present invention in keeping with the aforementioned objects is an improved head carriage assembly which obviates the need for employing straddle erase heads in disk recording apparatus employing permanently mounted flexible or rigid disks.

A still further object is an improved head carriage in accordance with the previous objects which includes means for eliminating periodic adjustments of straddle erase heads in disk recording apparatus requiring such heads for reasons other than thread wear, thermal expansion and backlash.

In accordance with the above objects, there is provided an improved magnetic disk head carriage assembly for supporting a magnetic head assembly comprising a single-piece injection-molded head assembly receiving platform. The platform is made from a glass fiber filled polycarbonate thermoplastic compound in which there is added a dry lubricant for increased life and self-lubricating properties. The platform is symmetrical about two axes and is provided with a pair of extended, generally rectangular beam-shaped leg members which are positioned symmetrically about a center line through the center of the platform. Each of the leg members is terminated by a threaded bore for threadably receiving a lead screw. Positioned between the leg members, there is provided a compression spring member which serves to spread the legs outwardly equally and symmetrically from the aforementioned center line. When the carriage assembly is threaded on a lead screw, the spring member is coaxial with the lead screw and, in spreading the leg members, biases the leg members against opposing flanges of the threads of the lead screw.

While the leg members of the platform are sufficiently flexible to be spread apart slightly in a direction parallel to the lead screw, their rectangular cross-section provides sufficient rigidity in a direction normal to the lead screw such that the head-to-disk interface dimensional stability is controlled and stepper motor torque forces are dissipated.

As previously indicated, the platform is provided for receiving and supporting a magnetic head assembly. The head assembly comprises a pair of parallel magnetic disk heads mounted on a common ceramic slider. The slider is fitted to and terminates a pair of leaf spring members which are provided for spring loading the heads against the disk surface with a constant force of 100 grams. With the opposite end of the spring members mounted on the platform, the heads are positioned symmetrically between the leg members of the platform and over the center line of the lead screw. In this position and with the amount of spring loading described, the heads "fly" on a film of air below the disk surface due to the disk's rotation. The distance between the disk surface and the heads varies from 55 micro-inches near the spindle to 85 micro-inches at the disk perimeter.

As in prior known lead screw driven head carriages, the carriage of the present invention is further provided with a pair of guide rod engaging tabs which extend from the platform for engaging a guide rod positioned to extend parallel to the lead screw. The rod and tabs cooperate in a sliding relationship to prevent the twisting of the carriage about the lead screw.

DESCRIPTION OF THE DRAWINGS

The above and other objects, features and advantages of the present invention will become apparent to those skilled in the art in the following detailed description of the accompanying drawings in which.

DETAILED DESCRIPTION

Figure 1:
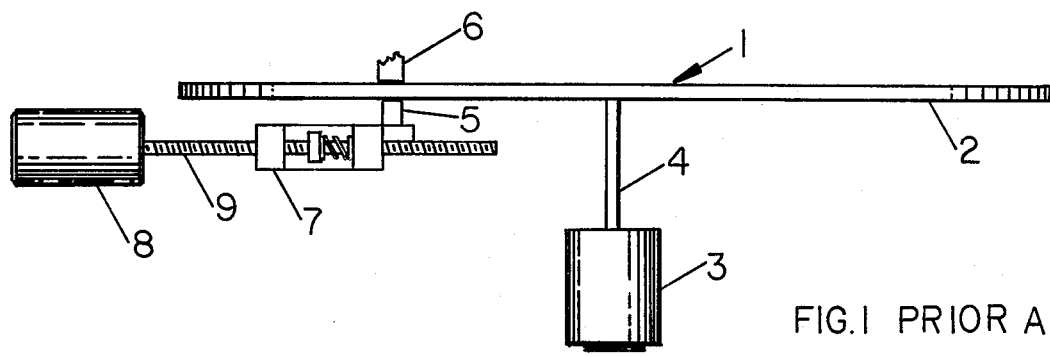
FIG. 1 is a diagrammatic elevation view of a prior known magnetic disk recording apparatus.
Figure 3:
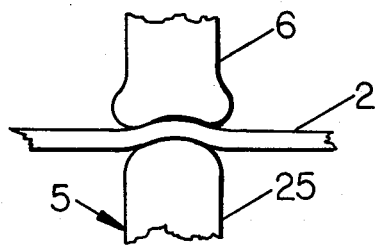
FIG. 3 is an enlarged partial side view of the disk, head and pressure pad of FIG. 1.

Referring to FIGS. 1, 2, 3 and 4, there is illustrated a typical prior art flexible disk recording apparatus 1. In apparatus 1, there is provided a thin flexible magnetic disk 2. Disk 2 is coupled for rotation to a motor 3 by a shaft 4. Motor 3 is provided to rotate disk 2 between a magnetic straddle erase head assembly 5, having a head portion 25, and a head pressure pad 6. As seen in FIG. 3, pad 6 serves to press the disk 2 against the head 5 and to actually cause the disk to wrap slightly about the head portion 25 for maintaining a close contact between the head portion and the disk.

Figure 4:
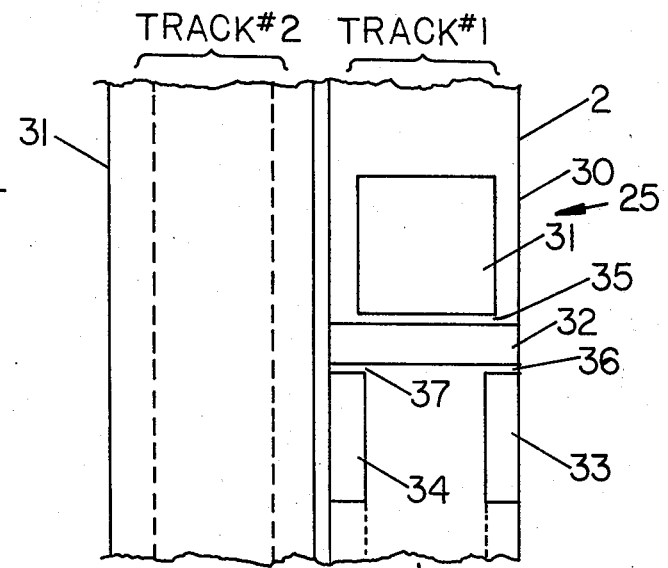
FIG. 4 is an enlarged partial diagrammatic representation of the straddle erase head of FIG. 3.

As is well known, recordings on the disk 2 are made in a plurality of annular concentric tracks such as tracks 30 and 31 shown in FIG. 4. To move the head assembly 5 radially over the surface of disk 2 for forming the recording tracks, there is provided a movable head carriage assembly 7 coupled to a stepper motor 8 by means of a lead screw 9.

Figure 2:
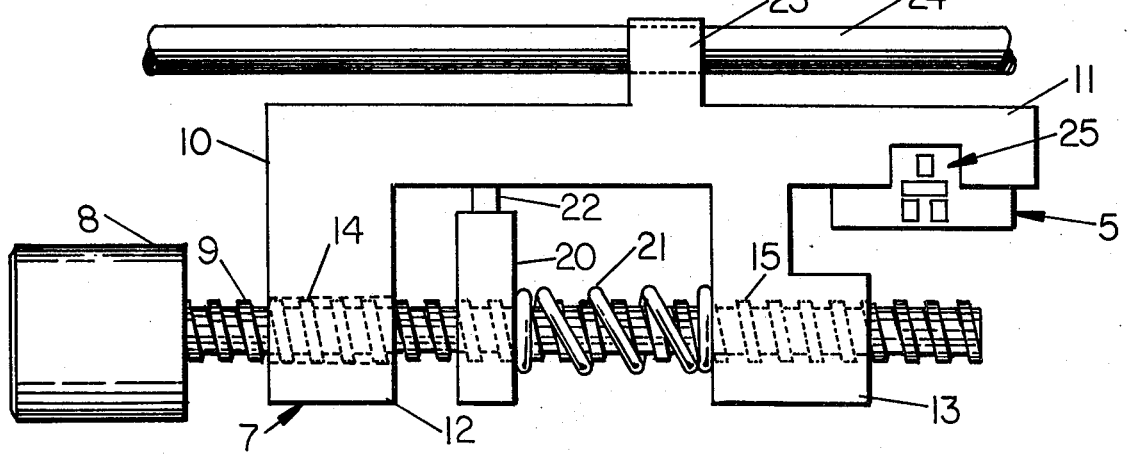
FIG. 2 is an enlarged plan view of the head carriage assembly of FIG. 1.
Figure 5:
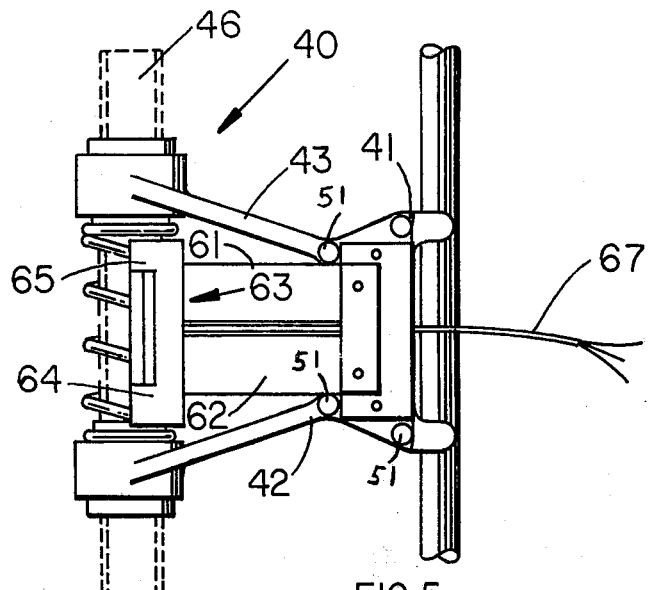
FIG. 5 is a plan view of a magnetic disk head carriage assembly according to the present invention.
Figure 7:
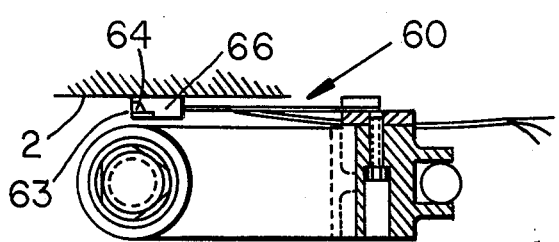
FIG. 7 is a side cross-sectional view of the head carriage assembly taken along lines 7—7 of FIG. 6 with a diagrammatic view of a disk member and its relationship to a carriage mounted magnetic head member.
Figure 8:
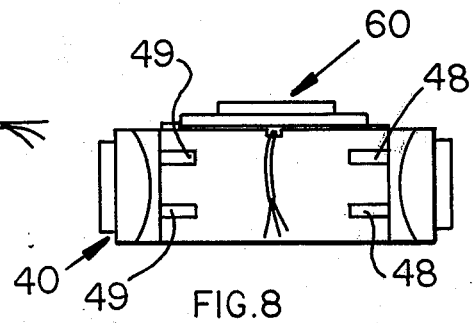
FIG. 8 is an end view of the head carriage assembly of FIG. 7.
Figure 6:
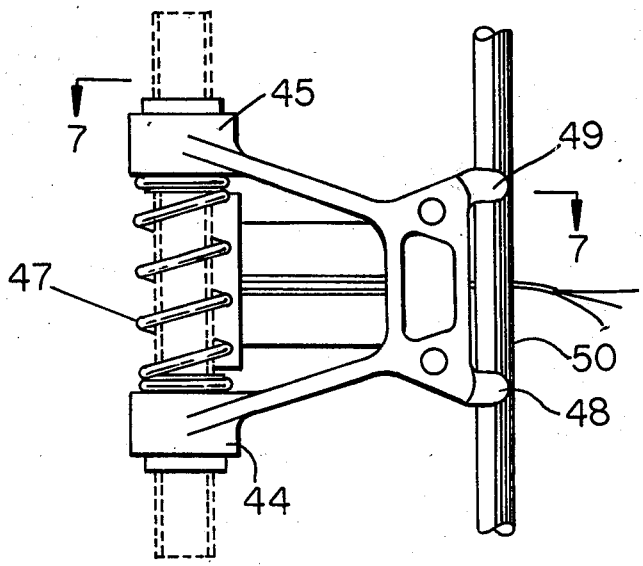
FIG. 6 is a bottom plan view of the head carriage assembly of FIG. 5.

As shown more clearly in FIG. 2, there is provided in head carriage assembly 7, a head assembly receiving platform 10. Platform 10 includes an extended portion 11 on which is mounted the head assembly 5 and a pair of spaced apart leg members 12 and 13. Leg members 12 and 13 are terminated, respectively, by a smooth bore 14 and a threaded bore 15 for receiving the lead screw 9. Intermediate leg members 12 and 13 and coaxial with lead screw 9 there is provided a nut member 20 and a spring 21. Nut 20 is threaded on lead screw 9 and prevented from rotating relative to the platform 10 by means of a nut retaining member 22 which is fixed to the platform. The nut 20 serves to retain the spring 21 against the leg member 13 for biasing the threads of the bore 15 against the flanges of the threads of the lead screw 9 to thereby eliminate the effects of backlash between the lead screw 9 and the platform 10.

Extending from platform 10, there is further provided one or more guide rod engaging tabs 23, only one of which is shown, for slidably engaging a guide rod 24. Rod 24 is positioned to extend parallel to lead screw 9 and, in cooperation with tabs 23, serves to guide carriage assembly 7 and prevent its twisting about the lead screw.

As stepper motor 8 and lead screw 9 index head carriage assembly 7 back and forth radially over the disk 2, wear occurs between the contacting surfaces of the lead screw threads and the threads of the bore 15 of the leg member 13. In time, the wear accumulates resulting in an ever increasing shift of the head carriage assembly 7 from a predetermined initial position on the disk 2 to a new position in the direction of the biasing force of the spring 21. Simultaneously, traverse movement of the head carriage assembly may occur as a result of the clearance between the wall of bore 14 and the lead screw causing a skewing of the head 25 on the disk 2. To compensate for these effects, head 25 of head assembly 5, as shown diagrammatically in FIG. 4, is provided with a plurality of pole pieces 31, 32, 33 and 34 about which are wrapped electrical coils (not shown) for forming what is called the straddle erase or tunnel erase head.

Referring to FIG. 4, pole pieces 31 and 32 are positioned to form a gap 35 for forming a read/write head. Pole pieces 32 and 33 and pole pieces 32 and 34 are positioned to form a pair of gaps 36 and 37, respectively, for forming a pair of spaced erase heads which straddle the read/write head. The positioned relationship between the read/write head and the erase heads is such that, in operation, immediately following a recording of a track of data, the straddling erase heads erase a portion of the peripheral edges of the recorded track, so as to prevent destructive interference between the recorded information on adjacent tracks. Since the disk area erased by the pole pieces 32 and 34 is in addition to that portion of the disk which normally is unrecorded due to the incremental indexing of the stepper motor, there results a considerable and undesirable amount of wasted storage space on the disk.

To eliminate, or at least reduce, this additional unused disk storage space and the expense associated therewith, there is provided, in accordance with the present invention, an improved lead screw driven head carriage assembly for supporting a fixed or a "flying head" which may be used in lieu of the aforementioned straddle erase heads in both flexible and rigid disk machines using permanent, as distinguished from removable disks.

The improved head carriage may also be used in disk machines using removable disks; however, in some of these applications, there may still remain the need for using the straddle erase heads.

Referring to FIGS. 5–8, there is provided, in accordance with the present invention, a head carriage assembly 40 for use in both flexible and rigid disk recording apparatus. In assembly 40, there is provided a head assembly receiving platform 41 from which extends a pair of beam-shaped members 42 and 43. Each of leg members 42 and 43 is terminated by a threaded bore 44 and 45, respectively, for threadably receiving a threaded lead screw 46. Lead screw 46 may be substantially identical to lead screw 9, previously described with respect to FIGS. 1 and 2.

Intermediate legs 42 and 43, there is provided a helical compression spring 47. Spring 47 is positioned about and coaxial with lead screw 46 and serves to spread legs 42 and 43 apart so as to bias each of the legs against opposing flanges of corresponding threads of lead screw 46.

Extending from platform 41 in an opposite direction from legs 42 and 43, there is provided a plurality of guide rod engaging tabs 48 and 49. Tabs 48 and 49 are provided to slidably engage a guide rod 50. Rod 50 is positioned to extend parallel to lead screw 46 and prevents twisting of the carriage assembly 40 about the lead screw as described with respect to rod 24 of FIG. 2.

Mounted on platform 41 is a head assembly 60. Head assembly 60 comprises a pair of spaced leaf spring members 61 and 62. Members 61 and 62 are terminated at one end by a head member 63. In head member 63 there are provided two parallel magnetic disk heads 64 and 65. Heads 64 and 65 share a common ceramic slider unit 66 and "fly" on a film of air created adjacent to the disk surface as the disk rotates. The opposite ends of spring members 61 and 62 are mounted to the platform 41 in a three-point registration with the platform so as to position the heads 64 and 65 symmetrically about a center line passing between legs 42 and 43 and over the center line of the lead screw 46. The three-point registration is provided by three raised bosses 51 against which the head member 60 is abutted. Positioning the heads near the lead screw's center line is found to minimize the effects of stepper motor lead screw runout and those of head inertia during an indexing operation. For providing an electrical connection to head 25, there is provided, coupled to the head, a cable 67.

In practice, platform 41 is a single piece, injection-molded from a glass fiber filled polycarbonate thermoplastic compound with a dry lubricant added for long life and self-lubrication. Being symmetrical along two axes, it provides for cancelling the effects of compliance and flexibility in the directions required for wear, damping, thermal expansion and backlash compensation while remaining rigid in the directions required for controlling the head-to-disk interface dimensional stability and dissipating stepper motor torque forces.

With the heads 64 and 65 spring-loaded against the disk surface at rest with a constant force of 100 grams, the heads "fly" in operation at 55 micro-inches from the surface near the axis of rotation of the disk and 85 micro-inches near the disk perimeter. By insuring precise registration between the heads 64 and 65 and the disk tracks, notwithstanding thread wear, thermal expansion, etc., the need for customary straddle heads, at least to the extent that they are required to compensate for the effects of such conditions, is eliminated.

Alternatively, for use in a flexible disk machine, the head assembly 60 is more rigidly supported in any suitable manner on the platform 44 and the assembly used with a backup pressure pad, such as pad 6 described with respect to FIG. 3.

While a specific preferred embodiment of a head carriage and several alternatives have been described for use in both flexible and rigid disk machines, it is understood that various other modifications may be made within the spirit and scope of the present invention as hereinafter claimed.

What is claimed is:

1. For use in a magnetic disk recording apparatus having a magnetic disk member, a threaded lead screw, a motor for turning said lead screw for indexing a head carriage over the surface of said disk, and a guide rod for checking twisting of said head carriage about said lead screw, an improved magnetic disk head carriage assembly comprising:

a magnetic disk head assembly;
   means forming a receiving platform for receiving said disk head assembly;
   a first and a second beam-shaped member extending from said receiving platform, said beam-shaped members being symmetrically located with respect to a center line through said platform and being terminated by a lead screw receiving means for receiving said lead screw;

means extending from said platform for engaging said guide rod for checking rotation of said platform about said lead screw;

means for mounting said head assembly to said receiving platform symmetrically with respect to said platform center line; and means for resiliently biasing said first and said second beam-shaped members against opposing threads of said lead screw for cancelling the effects of wear, thermal expansion and backlash between said lead screw and said platform.

2. A head carriage assembly according to claim 1 wherein said magnetic disk head assembly comprises:
a magnetic disk head member;
head supporting means terminated at one end by said head member; and
means for mounting said head supporting means to said disk head assembly receiving platform in a cantilever fashion.

3. A head assembly according to claim 2 wherein said head supporting means comprises a flexible resilient means for resiliently biasing said head member toward the surface of said magnetic disk member.

4. A head assembly according to claim 3 wherein said flexible resilient means comprises a first and a second spaced apart leaf spring member.

5. A head assembly according to claim 3 further comprising means for electrically coupling said head member to a source of electrical signals.

6. A magnetic disk head carriage assembly according to claim 1 wherein said lead screw receiving means terminating said beam-shaped members is threaded for threadably receiving said threaded lead screw, said beam-shaped members are resilient, and said biasing means comprises spring means positioned between said lead screw receiving means terminating said beam-shaped members for resiliently biasing the threads of said lead screw receiving means against corresponding threads of said lead screw.

7. For use in a magnetic disk recording apparatus having a threaded lead screw, a magnetic disk head carriage comprising:
a U-shaped head assembly receiving platform having a first and a second resilient leg member, each leg of said platform being terminated by a lead screw receiving member with each said lead screw receiving member including means for engaging threads on said lead screw; and
means for resiliently biasing said lead screw thread engaging means in each of said lead screw receiving members against opposing flanges of said lead screw threads.

8. A head carriage assembly according to claim 7 wherein said lead screw thread engaging means in each of said leg members comprises a threaded bore and said biasing means comprises a spring member.

9. A head carriage assembly according to claim 7 further comprising:
a magnetic disk head assembly; and
means for mounting said head assembly to said head assembly receiving platform in cantilever fashion.

10. A head carriage assembly according to claim 9 wherein said head assembly comprises:

a head member;
a resilient member terminated at one end by said head member; and
means for electrically coupling said head member to a source of electrical signals.

11. A magnetic disk head carriage assembly comprising:
means for supporting a magnetic head assembly;
means forming a pair of spaced rectangularly-shaped leg members extending from said supporting means;
means terminating each of said leg members for engaging threads of a lead screw, said leg members being relatively flexible in a direction parallel to the axis of the lead screw; and
means coacting with said flexibility of said leg member for resiliently biasing said thread engaging means in each of said leg members against the threads of the lead screw for providing thread wear, thermal expansion and backlash compensation.

12. A head carriage assembly according to claim 11 wherein each of said leg members is relatively rigid in a direction normal to the axis of the lead screw and further comprising means coacting with said rigidity of said leg members for checking twisting of said supporting means about the axis of the lead screw.

13. A head carriage assembly according to claim 12 wherein said biasing means comprises a spring member positioned between said leg members for spreading said leg members in said direction parallel to the axis of the lead screw.

14. A head carriage assembly according to claim 13 wherein said engaging means terminating each of said leg members is a threaded bore and said spring member is positioned to be coaxial with the axes of said threaded bores.

15. A head carriage assembly according to claim 14 wherein said supporting means and said leg members are molded in a single piece.

16. A head carriage assembly according to claim 15 wherein said supporting means and said leg members are molded in a single piece from a glass fiber filled polycarbonate thermoplastic compound.

17. A head carriage assembly according to claim 11 further comprising:
a magnetic head assembly; and
means for mounting said head assembly on said supporting
means symmetrically between said leg members for positioning said head member over the axis of the lead screw.

18. A head carriage assembly according to claim 17 wherein said head assembly comprises:
a spring member; and
means for mounting said head member to one end of said spring member; and further wherein said means for mounting said head assembly on said supporting means comprises means for mounting said spring member on said supporting means in cantilever fashion.

* * * * *